United States Patent [19]

Abefelt et al.

[11] Patent Number: 5,450,398
[45] Date of Patent: Sep. 12, 1995

[54] METHOD OF DISTINGUISHING IN SERIAL DIGITAL BIT STREAMS BETWEEN AT LEAST TWO TYPES OF TIME SLOTS IN A BIT STREAM RECEIVER

[75] Inventors: Eric O. Abefelt, Vallingby; Lars G. Schyman, Tumba; Carl P. B. Lundh, Farsta, all of Sweden

[73] Assignee: Telefonaktiebolaget LM Ericsson, Stockholm, Sweden

[21] Appl. No.: 84,460

[22] Filed: Jul. 1, 1993

[30] Foreign Application Priority Data

Jul. 1, 1992 [SE] Sweden ................ 9202031

[51] Int. Cl.⁶ .................. H04L 12/50; H04J 3/12
[52] U.S. Cl. ................. 370/60.1; 370/68.1; 370/110.4
[58] Field of Search ............. 370/82, 83, 84, 94.1, 370/91, 43, 48, 110.1, 102, 112, 95.1, 16, 79, 99, 110.4, 94.2, 60.1, 68.1; 375/117, 118

[56] References Cited

U.S. PATENT DOCUMENTS

| 4,156,111 | 5/1979 | Downey et al. | 370/83 |
| 4,367,549 | 1/1983 | Vachee | 370/91 |
| 4,425,562 | 1/1984 | De Niet | 340/347 DD |
| 4,446,555 | 5/1984 | Devault et al. | 370/94.1 |
| 4,635,255 | 1/1987 | Clark et al. | 370/110.1 |
| 4,761,781 | 8/1988 | Calvignac et al. | 370/94.1 |
| 4,779,269 | 10/1988 | Bouillot et al. | 370/110.1 |
| 4,809,271 | 2/1989 | Kondo et al. | 370/110.1 |
| 4,891,808 | 1/1990 | Williams | 370/112 |
| 5,121,385 | 6/1992 | Tominaga et al. | 370/112 |

FOREIGN PATENT DOCUMENTS

| 0425475 | 5/1991 | European Pat. Off. |
| 2828761 | 5/1986 | Germany . |
| 3917214 | 12/1989 | Germany . |

Primary Examiner—Benedict V. Safourek
Assistant Examiner—Chau T. Nguyen
Attorney, Agent, or Firm—Burns, Doane, Swecker & Mathis

[57] ABSTRACT

A method for distincting between at least two types of time slots in serial digital bit streams that are transmitted over a link between a transmitter and a receiver and that derive from the streams of parallel data bits which are delivered to the transmitter via an interface and subjected to parallel-series conversion in the transmitter. Subsequent to analyzing the parallel data bits in a time slot, the type of category to which this time slot belongs is decided and a plurality of marker bits are then inserted into the serial time slots, so as to obtain good transmission properties and also be restore the time slots to a parallel form. More specifically, the time slot categories are mutually separated with the aid of a different number of marker bits in the time slot, all of these marker bits having been assigned the inverted value of a bit other than the marker bits.

12 Claims, 6 Drawing Sheets

Fig. 2

| bit 8 | bit 7 | bit 6 | bit 5 | bit 4 | bit 3 | bit 2 | bit 1 | bit 0 |
|---|---|---|---|---|---|---|---|---|
| 1=DTS | data | data | data | data | data | data | data | data |
| 0=CTS | data=field | data | data | data | data | data | data | data |
| 0=CTS | 1 flag | not used | data | data | data | data | data | data |

Fig. 3

| Type | IN<br>DIN8,7,6,5 | OUT<br>d8,7,6 |
|---|---|---|
| CTS-field | 0000 | 110 |
| CTS-field | 0001 | 110 |
| CTS-field | 0010 | 001 |
| CTS-field | 0011 | 001 |
| CTS-flag | 0100 | 111 |
| CTS-flag | 0101 | 000 |
| CTS-flag | 0110 | 111 |
| CTS-flag | 0111 | 000 |
| DTS | 1000 | 100 |
| DTS | 1001 | 100 |
| DTS | 1010 | 101 |
| DTS | 1011 | 101 |
| DTS | 1100 | 010 |
| DTS | 1101 | 010 |
| DTS | 1110 | 011 |
| DTS | 1111 | 011 |

| IN d'8,7,6 | OUT DUT8,7 | Type |
|---|---|---|
| 000 | 01 | CTS-flag |
| 001 | 00 | CTS-field |
| 010 | 11 | DTS |
| 011 | 11 | DTS |
| 100 | 10 | DTS |
| 101 | 10 | DTS |
| 110 | 00 | CTS-field |
| 111 | 01 | CTS-flag |

METHOD OF DISTINGUISHING IN SERIAL DIGITAL BIT STREAMS BETWEEN AT LEAST TWO TYPES OF TIME SLOTS IN A BIT STREAM RECEIVER

FIELD OF THE INVENTION

The present invention relates to a method of distinguishing between at least two types of time slots in a bit stream receiver in conjunction with the transmission of serial digital bit streams which are divided into a number of different types of time slots.

According to another aspect, the present invention also relates to a system which enables a distinction to be made between at least two types of time slots in the serial digital bit streams that are transmitted over a link between a transmitter and a receiver and that derive from the streams of parallel data bits which are delivered to the transmitter via an interface and subjected to parallel-series conversion in the transmitter.

BACKGROUND OF THE INVENTION

In telecommunication network and data network switches, the serial link interface is located in the so-called device connecting means of the switch. The device connecting means include links between the switch core, multiplexors, and end devices.

It has been found desirable for such links to have the following properties:
- line codes which guarantee changes between zeros and ones;
- a high balance probability between the number of zeros and the number of ones, so as to enable relatively simple transmission equipment to be used;
- space for additional information so as to be able to distinguish between different types of time slots, for instance, between time slots for circuit switched data and packet switch data, so as to enable memories which contain information concerning the types of respective time slots to be dispensed with; and
- the line code and the additional information may only marginally increase the rate.

U.S. Pat. No. 4,891,808 relates to time multiplex in the transmission of sampled data from a plurality of parallel input channels on a serial signal line and restoring the parallel data from the serial line. A synchronization marker is inserted directly into data for at least one given channel which shall be used as a marked or synchronization channel. The marker is arranged as an "impossible" data pattern. When a plurality of unchanged levels (e.g. binary ones) occur in a bit storage register, a central bit is inverted and thereby marks the channel. The inverted marking bit is detected and eliminated in the receiver end, and/or is used to reset the channel counter when the marking bit is detected on a channel other than the marker channel. U.S. Pat. No. 4,446,555 describes asynchronous time multiplex switching. Time slots containing sample words have different numbers of bits. Information concerning "the rank of the time slot or packet additional channel in the hybrid frame" is added. An indicator bit or bit group distinguishes the sample words from the packets. Not all of the time slots have the same bit capacity and the total number of bits per frame is known.

EP 425,475 discloses a data transmission system pertaining to the recording of an audio signal. The data signal is composed of serial data consisting of bits. A "dummy bit" is inverted in relation to the introductory bit.

SUMMARY OF THE INVENTION

A general object of the present invention is to achieve good transmission properties with the aid of a method and a system of the kind defined in the introduction, so as to enable relatively simple transmission equipment to be used. A more particular object of the present invention is to enable a distinction to be made readily between time slots for circuit switched data and time slots for packet switched data.

According to the first aspect of the present invention, these objects have been achieved with a method of the kind defined in the introduction by distinguishing between the different types of time slots with the aid of a different number of marker bits in the time slots, all of these marker bits having been assigned the inverted value of a bit other than the marker bits.

According to the second aspect of the present invention, the aforesaid objects have been achieved with a system of the kind defined in the introduction by deciding the category to which a time slot belongs subsequent to analyzing the parallel data bits in said time slot, whereafter a plurality of marker bits are inserted into the serial time slots so as to obtain good transmission properties and so as to enable the time slots to be restored to parallel form, wherein a distinction is made between the different types of time slots by using in the time slots a different number of marker bits of which all have been assigned the inverted value of a bit other than the marker bits.

Expressed differently, some of the parallel data bits are used to control the number of marker bits in the serial data streams in a manner such that different numbers of marker bits are used in the different types of time slots, and in that prior to the parallel-series conversion, these marker bits are delivered to coding means in the transmitter together with a bit for assigning the marker bits the inverted value of this last-mentioned bit, and in that subsequent to series-parallel conversion in the receiver, the thus coded marker bits and said other bit are delivered to decoding means in the receiver for restoring the bits to their original value subsequent to transmission.

Preferably, the marker bits are the initial bits in the time slot and are assigned the inverted value of the first bit that follows the marker bits.

According to one preferred embodiment, data time slots for circuit switched data and field control time slots and flag control time slots for packet switched data are distinguished respectively by one, two and three marker bits per time slot.

When scrambling is applied in order to reduce the risk of imbalance between the number of zeros and ones, scrambling is effected solely on bits 0–6.

BRIEF DESCRIPTION OF THE DRAWING

Embodiments of the present invention will now be described in more detail with reference to the accompanying drawings, in which

FIG. 2 is a table which illustrates how the bits in an input interface of the link shown in FIG. 1 are interpreted;

FIGS. 3 and 4 illustrate in table form definitions of how a coder and a decoder respectively in the link shown in FIG. 1 are defined;

FIG. 5 illustrates a scrambling/descrambling device;

DETAILED DESCRIPTION

Figure 1:
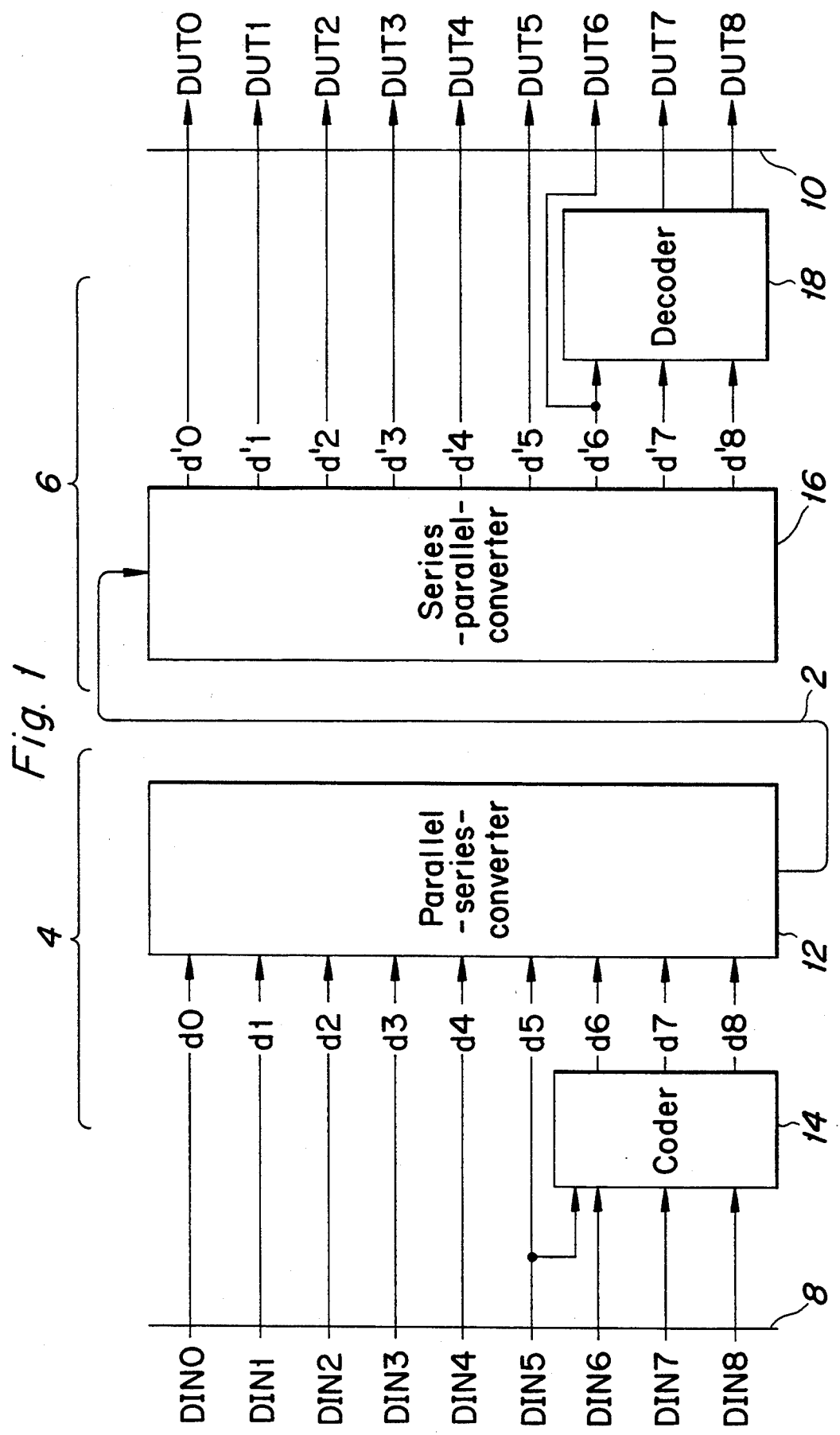
FIG. 1 illustrates a serial link in which one embodiment of the inventive method is applied.

FIG. 1 illustrates a link for serial digital bit streams generally referenced 2, and a transmitter and a receiver belonging to the link, generally referenced 4 and 6 respectively. The transmitter 4 includes an interface 8 on its input, and the receiver 6 includes an interface 10 on its output.

In the case of switches for tele-networks and data networks, for instance, such serial link interfaces are located in the so-called device connecting means of the switch. The device connection includes links between the switch core, multiplexors, and so-called end devices, such as subscriber connections, trunk connections, processors, etc. U.S. patent application No. 07/990,964, which is commonly assignee (now U.S. Pat. No. 5,347,513), discloses an example of one such switch with corresponding device connection, and, is incorporated herein by reference document.

It is assumed in the illustrated case that the bit streams have been divided into time slots, each containing nine bits. The time slots are of mutually different types. The category to which a time slot belongs is decided by marker bits in respective time slots, as described in more detail below. The marker bits are used when data has been coded for serial transmission.

The described exemplifying embodiment pertains to time slots for circuit switched data, hereinafter referred to as DTS (=Data Time Slot), and for packet switched data, hereinafter referred to as CTS (=Control Time Slot). The latter time slot is divided into two sub-types, namely CTS-field-time slots and CTS-flag-time slots. The DTS-time slots and CTS-time slots include marker bits which enable a distinction to be made by the receiver, by analysis of one individual time slot.

The interface 8 receives data in the form of parallel data bits DIN0–DIN8.

In the parallel interface 8, the marker bit 8=1 indicates that the time slot is a DTS-type slot and marker bit 8=0 indicates that the time slot is a CTS-type slot, i.e., a CTS-field or CTS-flag. When the time slot is a CTS type slot, the marker bit 7=0 indicates that the time slot is a CTS-field type slot, and marker bit 7=1 indicates that the time slot is a CTS-flag type slot. Interpretation of the bits in the interface 8 is also shown in the FIG. 2 table.

The bits DIN0–DIN5 are delivered to a parallel-series converter 12 provided in the transmitter 4, and the bit DIN5 is also delivered to a coding device 14 provided in the transmitter 4, the bits DIN6–DIN8 also being delivered to this coding device. The bits DIN-5–DIN8 are coded in the coding device 14, which results in bits d6, d7 and d8, respectively, on the three outputs of said device. In order to indicate that a corresponding time slot is a DTS-time slot, the bit d8 is given the inverted value of the bit DIN7 by the coding device 10. When the time slot is a CTS-field time slot, the bits d8 and d7 are given the inverted value of bit DIN6, whereas in the case of a CTS-flag time slot, the bits d6–d8 are given the inverted value of the bit DIN5. Subsequent to leaving the coding device 14, the bits d6–d8 are delivered to the parallel-series converter 12.

The coding device 14 is defined by the Table shown in FIG. 3. It should be observed that when the input signals are a CTS-flag, the output signals are independent of bit 6. Since the bit 6 is not delivered to the parallel-series converter in any other way than through the coder 14, the information contained by the bit 6 will be lost when a CTS-flag is transmitted. The CTS-flag thus contains only six bits (0–5) that can be used for data. This is also shown in FIG. 2.

Figures 4, 5:
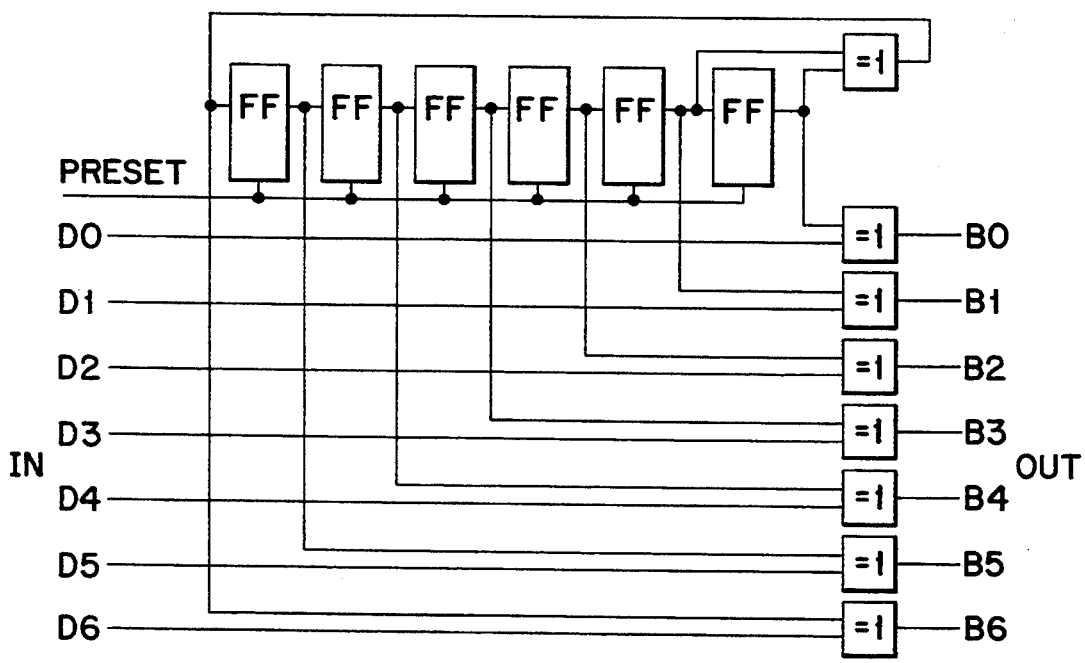

The receiver 6 at the other end of the link 2 receives the serial bit stream in a series-parallel converter 16, resulting in bits d'0–d'8 on the outputs of said converter, these bits corresponding to the bits d0–d8 on the inputs of the parallel-series converter 12. The bits d'6–d'8 are delivered to a decoding device 18. On the basis of knowledge of the aforedescribed principle of coding in the coding device 14, the decoding device 18 performs a decoding process which results in the recovery of the bits DUT7=DIN7 and DUT8=DIN8 at the interface 10. The decoding device 18 is defined in the table shown in FIG. 4.

In order to reduce the risk of imbalance between the number of zeros and ones on the line, particularly in the case of fixed patterns, so-called scrambling can be applied. The scrambling or descrambling principle will be described briefly with reference to FIG. 5, which is a schematic illustration of a so-called scrambler.

Data which is to be scrambled is delivered to inputs D0–D6 and data which has been scrambled is presented on outputs B0–B6. A feedback connected shift register, generally referenced 20, generates varying data which together with data D0–D6 is delivered to exclusive-OR-gates 22 on whose outputs B0–B6 occur. The feedback connected shift register 20 can be set to a desired value at appropriate points of time, by applying a preset-signal to an input 24.

This method of feedback connecting the shift register 16 is only one of several conceivable methods.

Scrambled data can be restored by applying the data to the inputs of a similar device, a so-called descrambler, provided that a signal is applied on the preset-input 20 at time points which correspond to those occasions on which corresponding signals have been applied to the side on which scrambling was effected.

Figure 6:
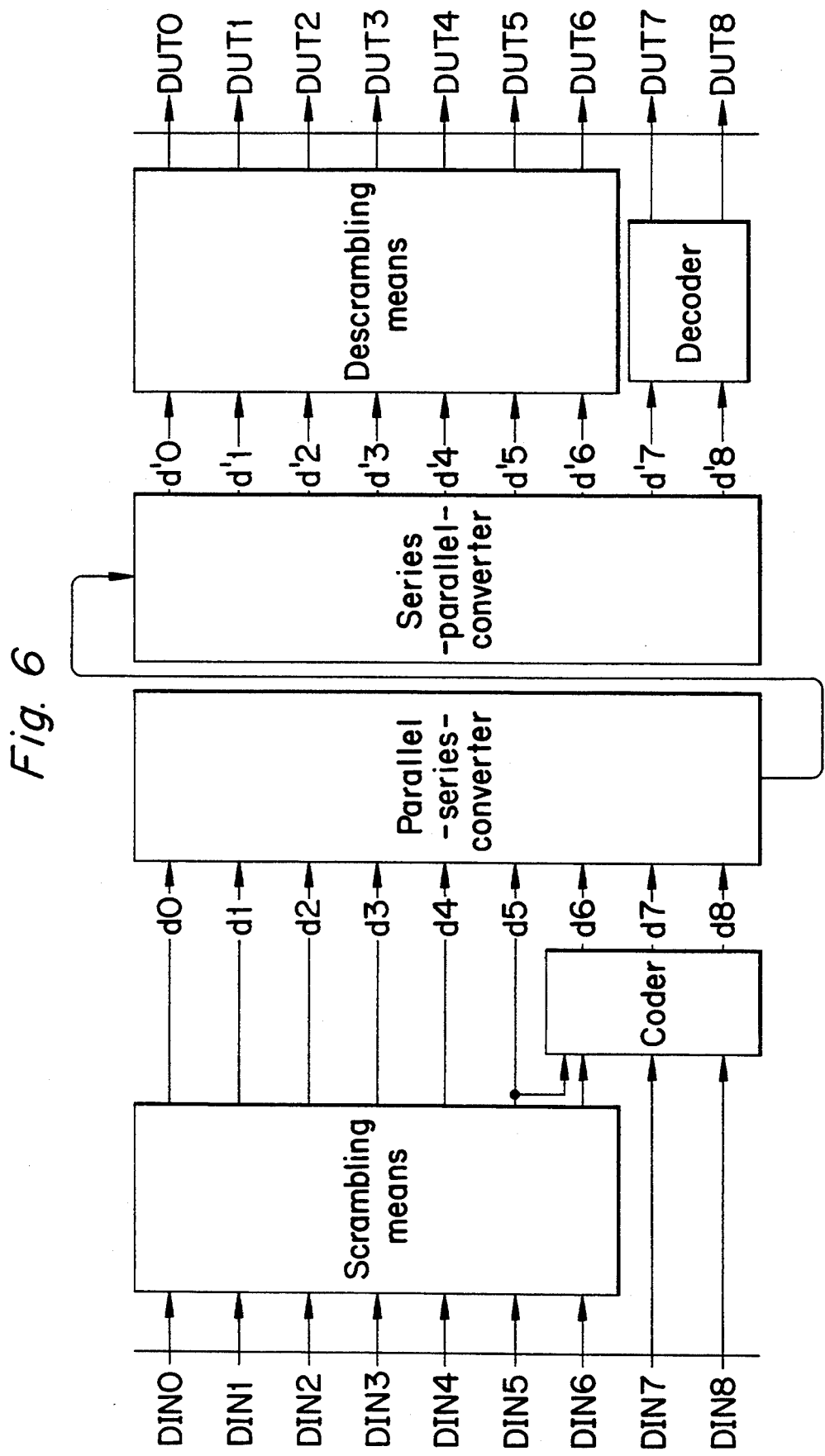
FIG. 6 illustrates a serial link in which a second embodiment of the inventive method is applied.

The application of scrambling/descrambling in a system constructed in accordance with the invention is illustrated in FIG. 6, in which elements corresponding to the elements of FIG. 1 have been identified with like reference signs. More specifically, this is effected by delivering the bits DIN0–DIN5 to the parallel-series converter 12 via a scrambler 26 and by delivering the bit DIN5 to the coding device 14 subsequent to scrambling the bits. The bit DIN6 is scrambled prior to being delivered to the coding device 14, but the bits DIN7 and DIN8, on the other hand, are not scrambled.

Descrambling is effected with the aid of a descrambler 28. Those bits which correspond to the bits DIN-0–DIN6 are delivered to the descrambler 28, wherewith the bit corresponding to bit DIN6 is passed directly to the decoding device 18.

Irrespective of whether the bits have been scrambled or not, the result is that bits DUT0–DUT8 are obtained at the interface 10, where DUT0=DIN0, DUT1-=DIN1, and so on ... DUT8=DINS, with one exception. This exception is that it is not certain that DUT6 is equal to DIN6 when DUT7=1 and DUT8=0 at the same time, i.e. when the time slot is a CTS-flag. The CTS-flag has thus only six bits that can be used for data, as mentioned earlier.

Figure 7:
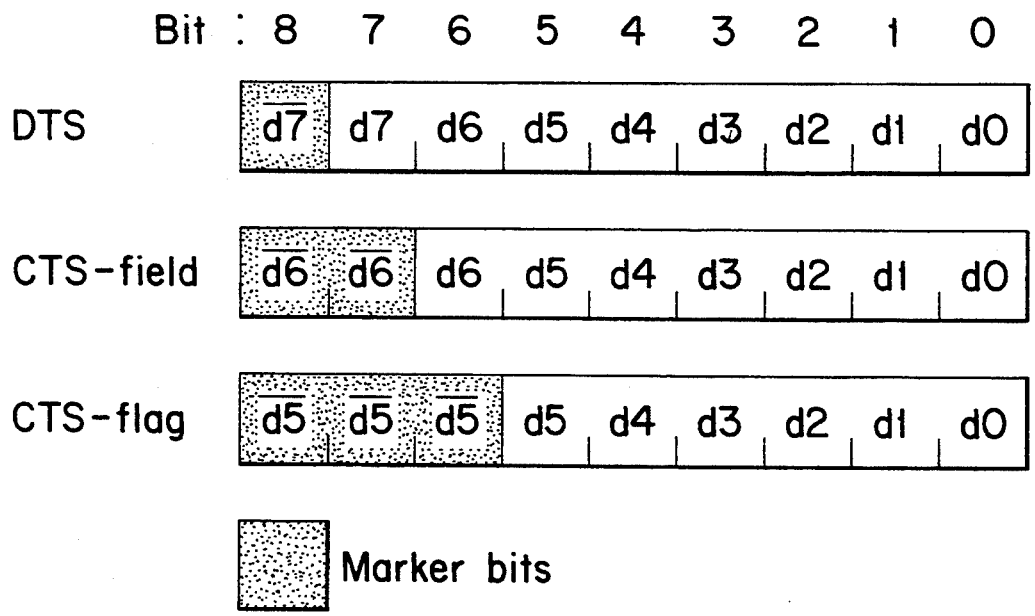
FIGS. 7 and 8 illustrate diagrammatically two respective cases of the marking and line coding of time slots transmitted on the link shown in FIG. 1.
Figure 8:
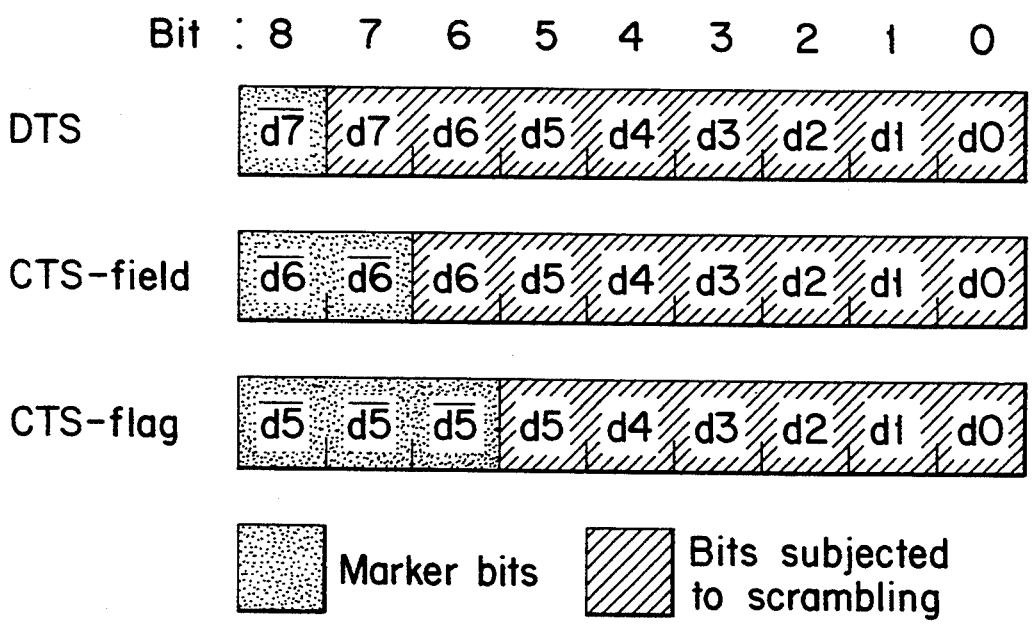

FIGS. 7 and 8 illustrate respectively, respectively those cases when coding is effected with and without scrambling. It will be noted that in a CTS-time slot, it is the bit number 7 in the parallel interface which determines whether the time slot is a CTS-field or a CTS-flag. A sequence of time slots coded in the aforedescribed manner results in at most eleven identical bits in a row. This comparatively low upper limit for the number of equivalent bits enables timing recovery to be realized relatively simply.

It will be noted that uniform distribution between zeros and ones is obtained, even with those bits which are not scrambled, since the bits DIN7 and DIN8 balance one another in each time slot; and the marker bits in CTS are controlled by bits which have been scrambled and which can therefore be considered statistically balanced, which means that these marker bits are also statistically balanced over a period comprising several time slots.

One reason why DIN7 is not scrambled is because it is not necessary and because timing recovery is realized more simply when scrambling is not effected.

Although the CTS-flag having only six scrambled bits would appear to be an exception, this is not so in practice because the marker bits are delivered after the scrambling process and write-over the insignificant DIN6 in the CTS-flag. Thus, seven bits are always scrambled in those time slots with which scrambling is carried out.

The invention affords the following advantages:

because the invention guarantees that data in serial form will not remain unchanged for more than a given number of bits, good transmission properties are obtained so that relatively simple transmission equipment can be used;

the invention enables the number of bit combinations to be utilized effectively, so that redundancy in the system will be low, despite the relatively simple implementation; and the inventive coding principle enables the time slots to be divided readily into different categories, in the illustrated embodiment three categories the first category has eight independent bits per time slot, the second has seven independent bits and the third has six independent bits.

In the first stage of the aforedescribed embodiment of the invention, this stage being known per se, a ninth bit is added to each 8-bit group and the ninth bit is given the inverted value of the eighth bit. There is thus obtained at most 8+1=9 similar bits in each row. Of all possible nine bit combinations, only half are used for transmitting information. According to the invention, however, more combinations are used for transmitting information.

Thus, in the next stage of the illustrated embodiment, those combinations in which the bits 8 and 7 have the inverted value of bit 6 are also used. This results in the use of a further one-fourth ($\frac{1}{4}$) of all 9-bit combinations. The highest number of identical bits in a single row will therewith be 8+2=10.

In the third stage of the described embodiment, combinations in which the bits 8, 7 and 6 have the inverted value of bit 5 are also used. In this way, a further one-eighth ($\frac{1}{8}$) of all 9-bit combinations is used, wherewith the highest number of identical bits in a row is 8+3=11.

The inventive method enables further stages to be applied, until combinations comprising solely nine ones and nine zeros are avoided, in which case the highest number of identical bits is 8+8=16.

The aforedescribed exemplifying method of the invention is suitable for application with the occurrence of time slots of which one type, or category, has eight bits, another type has seven bits, and a further type has six bits. This also applies, of course, to the aforedescribed embodiment, which includes DTS-time slots, CTS-field time slots and CTS-flag time slots respectively.

It will also be seen that the method can be easily carried into effect, because no conversions are required through the agency of tables, for instance.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

We claim:

1. A method pertaining to the transmission of serial digital bit streams which are divided into a number of different types of time slots, for distinguishing between at least two of the types of time slots in a bit stream receiver, comprising the steps of:

marking a different number of marker bits in each type of time slot, wherein all of said marker bits in each time slot are marked by assigning all of said marker bits in each time slot an inverted value of a bit closest to the marker bits in each of the time slots; and distinguishing between said types of time slots based upon the number of marker bits present in each time slot.

2. A method according to claim 1, wherein the marker bits form initial bits in the time slot and and the bit closest to the marker bits is a first bit that follows the marker bits.

3. A method according to claim 2, whereby said types of time slots comprise data time slots for circuit switched data, field-control time slots, and flag-control time slots for packet switched data, each time slot having one, two and three marker bits respectively.

4. A method according to claim 2, further comprising the step of:

scrambling a plurality of bits to reduce the risk of imbalance between the number of zeros and ones, wherein only bits 0–6 are scrambled.

5. A system for enabling a distinction to be made between at least two types of time slots in serial digital bit streams comprising:

a transmitter;

a receiver;

a link between the transmitter and the receiver, said time slots being transmitted over said link and are derived from streams of parallel data bits which are delivered to the transmitter through and interface and are subjected to parallel-series conversion in the transmitter, wherein the receiver enables a distinction as to which type of time slot a time slot belongs to subsequent to analyzing the parallel data bits in a time slot; and a plurality of marker bits which are inserted into serial time slots so as to obtain good transmission properties and also so as to restore the time slots in parallel form, wherein the different types of time slots are distinguished with the aid of a different number of marker bits in said time slots, all of which marker bits in each time slot have been assigned the inverted value of a bit closest to the marker bits in the time slot.

6. A system according to claim 5, wherein the marker bits form initial bits in the time slot and are assigned the inverted value of the first bit that follows the marker bits.

7. A system according to claim 6, wherein said time slots comprise data time slots for circuit switched data, field-control time slots, and flag-control time slots for packet switched data, each time slot having one, two and three marker bits respectively.

8. A method according to claim 6, further comprising means for scrambling a plurality of bits before being converted into said serial bit stream in order to reduce the risk of imbalance between the number of zeros and ones, wherein only bits 0–6 are scrambled.

9. A system for enabling a distinction to be made between at least two types of time slots in serial digital bit streams, comprising:
 a transmitter;
 a receiver;
 a link between the transmitter and the receiver over which digital bit streams are transmitted;
 an interface for delivering parallel data bits to the transmitter;
 said transmitter comprising:
  a coding means for coding at least one marker bit so that said at least one marker bit has the inverted value of a bit closest to said at least one marker bit, wherein a different number of marker bits are used in different types of time slots, and
  parallel-series conversion means for converting said at least one marker bit and said parallel data bits into a serial bit stream;
 said receiver comprising;
  a series-parallel conversion means for converting said serial bit stream into parallel data bits;
  a decoding means for decoding said at least one marker bit from said parallel data bits to restore the at least one marker bit to an original value, wherein the receiver enables a distinction as to which type of time slot is being used by determining the number of marker bits accompanying said parallel data bits.

10. A system according to claim 9, wherein the marker bits form initial bits in the time slot and are assigned the inverted value of the first bit that follows the marker bits.

11. A system according to claim 10, wherein said time slots comprise data time slots for circuit switched data, field-control time slots, and flag-control time slots for packet switched data, each time slot having one, two and three marker bits respectively.

12. A method according to claim 10, further comprising means for scrambling a plurality of bits before being converted into a serial bit stream in order to reduce the risk of imbalance between the number of zeros and ones, wherein only bits 0–6 are scrambled.

* * * * *